March 7, 1950 — A. S. ALBERTS ET AL — 2,499,348
FILM DEVELOPMENT REEL
Filed Oct. 18, 1946
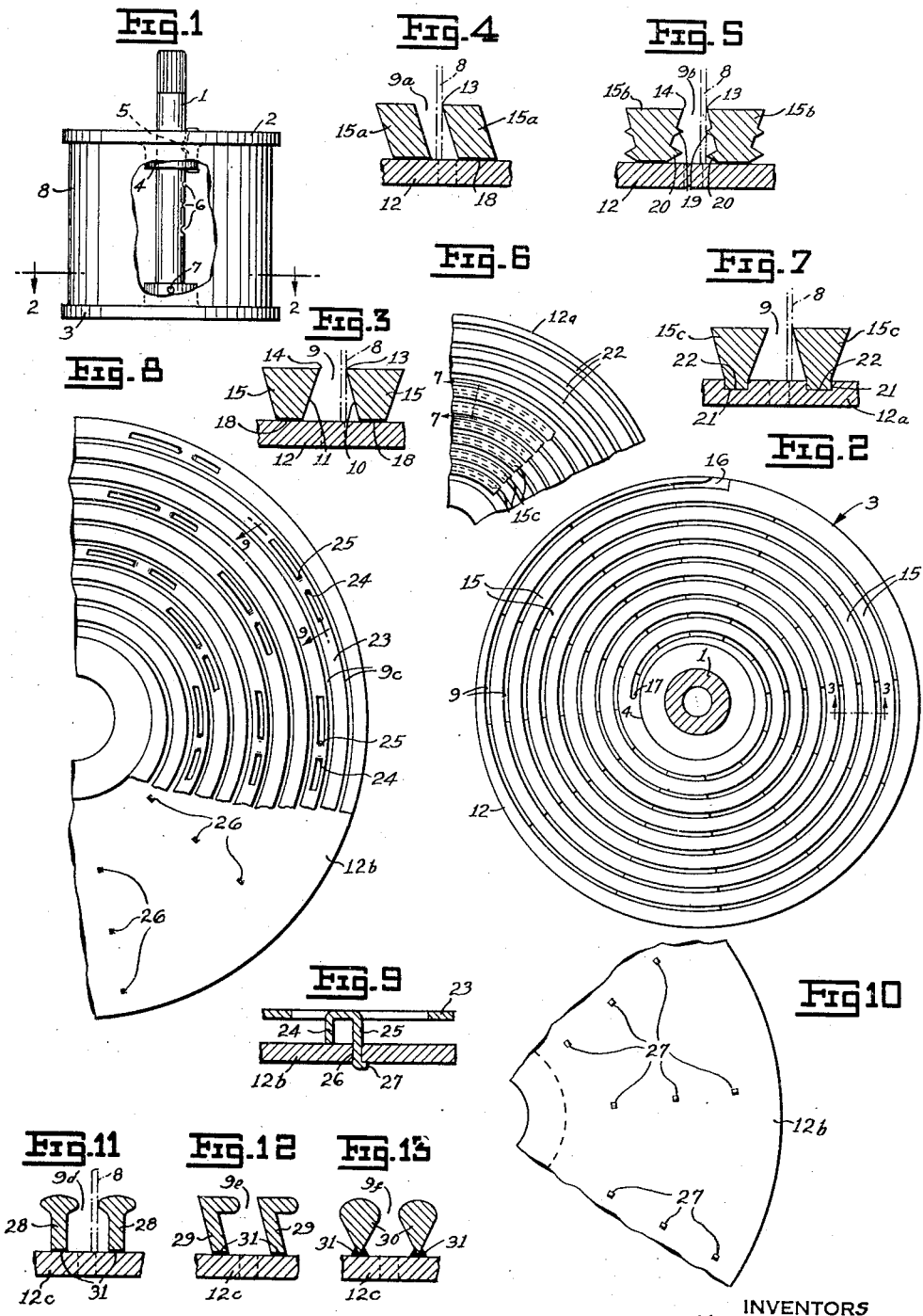
INVENTORS
Arthur S. Alberts
Sydney S. Alberts
BY
Pennie, Edmonds, Martin & Barrows
THEIR ATTORNEYS Patented Mar. 7, 1950

2,499,348

UNITED STATES PATENT OFFICE 2,499,348

FILM DEVELOPMENT REEL

Arthur S. Alberts and Sydney S. Alberts, Yonkers, N. Y.

Application October 18, 1946, Serial No. 704,152

12 Claims. (Cl. 242—77)

This invention relates to roll film-holding reels for use in photographic developing or processing tanks, and has as its aim the provision of an improved reel construction which facilitates the loading of the film into the reel.

Film reels used in photographic developing comprise a pair of discs mounted in appropriately spaced relation, the inner surfaces of the discs being provided each with a spiral groove or channel extending inwardly from the periphery of the disc. These channels engage the marginal edges of the film strip and support its convolutions in spaced relation to each other so that when the device is placed in the developing tank the developing or other treatment solution may contact the entire surface of the film. The reel may be loaded by feeding the edge of the film strip into the spiral channels commencing at the center of the reel and working outwardly, or by impelling, i. e. pushing, the film into the spiral channels commencing at the periphery of the reel and working the forward end of the strip toward the center.

This loading is done in the dark, and there is, accordingly, no opportunity for observing and correcting mistakes or accidents in the placing of the film in the spiral channels. Impelling the film into the channels from the outer edge of the reel toward the center is preferable to loading from the center outward. The latter method involves arching the film by squeezing or compressing its opposite edges in order to pass the edges over the spiral ribs and lay them in the channels formed between these ribs. Working in the dark there is constant danger of improperly laying in the film. This may result in two adjacent convolutions lying unseparated in the same channel and occasion non-development and spoilage of the touching areas of the film. This danger is absent when the film is inserted in the reel from the outside toward the center.

In view of the fact that the impelling or pushing action places the film under a compressional stress tending to cause it to buckle and to press against the walls of the spiral channel, it is important that the friction between the film and channel walls be reduced to a minimum, particularly when a long length of film is to be loaded. Moreover, reels as heretofore constructed can not be loaded by the outside toward the center method when wet or damp because of adhesion between the film and the damp channel surfaces. Even when the reel is apparently dry, this friction often renders the loading of the longer lengths of film difficult and sometimes impossible.

The object of the present invention is to provide a film reel which is so constructed that it can be readily loaded by pushing the film into the reel from its outer edge towards the center, regardless of whether the reel is wet or dry and whether long or short lengths of film are loaded.

Another object of the invention is to provide a film reel construction of this sort which is simple to manufacture.

The invention will be described in detail in connection with the accompanying drawings, which by way of example, show a number of embodiments of the inventive idea. In these drawings:

Fig. 1 is a side view of the improved film-holding reel with a coil of film loaded therein, the reel being shown in vertical position which is the position it occupies in the processing tank;

Fig. 2 is a sectional view taken on line 2—2 of Fig. 1 but with the film removed to show a face view of the spiral channels of one of the film discs, this view being drawn to an enlarged scale;

Fig. 3 is a fragmentary sectional view taken on line 3—3 of Fig. 2 and drawn to a still larger scale, this view together with Fig. 2 illustrating the preferred film channel construction employed in carrying out the invention;

Fig. 4 is a view similar to Fig. 3 showing a modification;

Fig. 5 is also a view similar to Fig. 3 showing another modification;

Figs. 6 and 7 illustrate still another modified form of channel construction, Fig. 6 being a fragmentary face view, similar to Fig. 2, of the modified reel disc, and Fig. 7 being a fragmentary section taken on line 7—7 of Fig. 6;

Figs. 8, 9 and 10 illustrate another modified form of reel disc construction, Fig. 8 being a fragmentary view of the disc similar to Figs. 2 and 6 and, like Fig. 6, having a part of the channel structure broken away. Fig. 9 is a fragmentary sectional view taken on line 9—9 of Fig. 8, and Fig. 10 is a fragmentary view similar to Fig. 8 but looking from the rear of the disc; and Figs. 11, 12 and 13 are fragmentary sectional views similar to Fig. 3 but showing three additional modifications of the film channel construction.

Referring now to these drawings there is shown in Fig. 1 a film-holding reel comprising a spindle 1, an upper reel disc 2 and a lower reel disc 3. Upper disc 2 is provided with a hub 4 between which and the surface of spindle 1 is fitted a spring clip 5, preferably formed of a narrow strip of spring metal. On one side of spindle 1 there is a series of notches 6, with any one of which the clip 5 may be selectively engaged. Notches 6 are placed at intervals along spindle 1 to correspond to the width of standard roll film, such for example as 35 mm., No. 127, 120, 116, etc.

The lower reel disc 3 may be permanently or removably fixed on the lower portion of spindle 1 in any desired manner as, for example, by means of a pin 7.

The film is supported by its margins, as is customary, by means of spiral channels formed in the faces of each of the two discs 2 and 3. In reels as heretofore constructed the walls of these channels either diverge outwardly so that the channels are slightly wider at their edges than at the bottom, or the channel walls are parallel and at right angles to the plane of the disc so that the cross section of the channel is rectangular. In either case when a film strip is inserted in the reel a considerable area of contact exists between the marginal surfaces of the film and the surfaces of the channel walls, producing the loading difficulties mentioned above caused by excessive friction between the marginal surfaces of the film strip and the channel walls.

In accordance with the present invention the walls of the spiral channels are so formed as to preclude the possibility of any considerable area of contact with the film. Thus, as shown in Figs. 2 and 3, particularly Fig. 3 which shows the cross section, the film channel 9 is trapezoidal in shape with the narrow side of the trapezoid forming the entrance to the channel. The opposite channel walls 10 and 11 slope toward one another outwardly from the base 12 of the disc to the channel entrance. Hence, side walls 10 and 11 of channel 9 have ridges or portions 13 and 14 at the edges of the channel entrance. Consequently, the marginal surface of the film 8 is supported by line contact with one or the other of these ridges 13 or 14. The slope of walls 10 and 11 is sufficient to keep them out of contact with the surface of the film except at these ridge portions 13 and 14.

The construction of Fig. 3 involves the employment of a rib structure 15, of trapezoidal shape in cross section and formed into a spiral coil. The base member 12 is a flat circular plate of the diameter of the reel disc and the spirally coiled rib structure 15 is secured to this plate in any suitable and convenient manner with the convolutions of the rib structure uniformly spaced apart to provide a continuous spiral channel 9 of uniform width between these adjacent convolutions from the mouth 16 at the periphery of base plate 12 to a point 17 adjacent the hub 4.

Base plate 12 and rib structure 15 may be made of any suitable material, molded plastic being preferred, the rib structure being united to base plate 12 preferably by means of a suitable cementitious material 18 which will bond the two parts into a substantially unitary structure.

Referring now to the modification shown in Fig. 4, the construction is like that just described except that the rib structure 15a is of different cross section, being that of a parallelogram. It is secured to base plate 12 in the same way, that is by means of cementitious material 18. The parallelogram cross section of rib structure 15a provides a single ridge portion 13 at the edge or entrance to the film channel 9a, which itself is of trapezoidal section. The adjacent convolutions of rib structure 15a are preferably spaced apart just sufficiently to permit a clearance between the inner edge of film 8 and the base of the wall of the film channel on the opposite side from ridge 13 when the edge of the film rests against the base member 12, as shown in dot and dash lines.

The modification shown in Fig. 5 is also similar to that described in connection with Figs. 2 and 3. In fact it is exactly like such construction except for the presence of one or more additional ridge portions projecting from the walls of film channel 9b in addition to the ridge portions 13 and 14 at the edges of the channel. As shown in Fig. 5 there are two additional ridge portions indicated respectively by reference numerals 19 and 20. The rib structure 15b is the same as rib structure 15 of Fig. 3. The tips of ridge portions 19 and 20 on one side of channel 9b are preferably arranged in alignment with ridge 13 and likewise on the opposite side of the channel the two additional ridge portions are preferably in alignment with ridge 14. It will be understood that the marginal surfaces of the film will be supported by all three of these ridge portions instead of merely by the single ridge at each side wall of the previously described constructions. It will be further understood that ridges 19 and 20 may be continuous throughout the length of the spiral channel, or if desired they may be interrupted, in which case the interruptions in the two ridges are staggered in respect to one another.

In Fig. 7 there is illustrated a modification which is exactly like the preferred form shown in Fig. 3 except for the fact that the rib structures 15c are provided at their bases with rectangular extensions which are received within corresponding spiral grooves 22 formed in the face of base plate 12a. The film channel 9 between these rib structures is precisely the same as film channel of Fig. 3. The rectangular extensions 21 are preferably held by frictional engagement in grooves 22, although they may be cemented in place if desired.

The various forms of construction described up to this point are particularly suitable to be manufactured of molded plastic material. In Figs. 8, 9 and 10 a modified form is shown which is intended more especially to be manufactured of metal, at least in part. Referring to these figures, the base plate 12b of the reel disc is preferably a circular plate of metal, although it may be made of plastic or other material. Spaced from the base plate 12b, as shown more particularly in Fig. 9, there is a channel forming member 23 which consists of a thin metallic strip edgewise coiled into a spiral as shown in Fig. 8 with its adjacent convolutions suitably spaced apart to constitute a spiral film channel 9c. The spirally coiled metal strip 23 is permanently secured to and held in spaced relation from base plate 12b by means of a series of pairs of tongues or tangs 24 and 25 stamped from and bent at right angles to the surface of spiral strip 23. Narrow elongated openings shown in Figs. 8 are left in the strip after these operations are performed. Tangs 24 are short and serve as spacers, while tangs 25 are passed through apertures 26 which are punched in plate 12b and headed over as shown at 27 in Figs. 9 and 10 to hold the parts together.

In Figs. 11, 12 and 13 modifications are shown which are intended more especially for manufacture entirely of metal. In these figures the base plate is indicated by numeral 12c and in Fig. 11 the respective rib structures by 28, 29 and 30, forming film channels 9d, 9e and 9f. These rib structures 28, 29 and 30 may be made of metal extruded in the form of the respective T-shape, inverted L-shape and oval-shaped cross sections. Elongated strips of such cross section are wound into spiral coils as heretofore mentioned, and may be secured to their respective base plates 13c by means of soldering, welding or the like as indicated by numeral 31, or by frictional means as described in connection with Fig. 7, or by other suitable fastening means. In each of these modifications the respective channel shapes 9d, 9e and 9f are provided with ridge portions at the channel entrance which support the surface of the film by substantially line contact.

Although a series of modifications have been used to illustrate the manner of carrying out the present invention, it will be understood that further changes in the shape of the rib structures and otherwise may be made without departing from the spirit or scope of the invention as set forth in the appended claims.

We claim:

1. A film-holding reel for use in film-developing tanks comprising two reel discs supported in spaced parallel relation and each having a spiral passageway on its inner face opening to the periphery thereof to receive one of the marginal edges of a film strip, each of said passageways having a bottom wall to guide one side of the film strip as it is pushed inwardly from the periphery of the spiral, and each passageway having a side wall formation including a substantially continuous film-supporting portion extending along the same substantially at the outer edge of one of the side walls defining the passageway to support the surface of the film strip by substantially line contact.

2. A film-holding reel for use in film-developing tanks comprising two reel discs supported in spaced parallel relation and each having a spiral passageway on its inner face opening to the periphery thereof to receive one of the marginal edges of a film strip, each of said passageways having a bottom wall to guide one side of the film strip as it is pushed inwardly from the periphery of the spiral, and the side wall at each side of the passageway having a substantially continuous film-supporting portion extending along the same substantially at the edge remote from the bottom wall of the passageway to support the surface of the film by substantially line contact.

3. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the film strip as it is pushed inwardly from the periphery of the spiral and each channel having a side wall formation including a plurality of substantially continuous film-supporting portions extending along the same in parallel relation, each of said film-supporting portions of the side wall formation of each channel being constructed and arranged to support the surface of the film by substantially line contact, and one of said film-supporting portions of the side wall formation of each channel being near the entrance of the channel.

4. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the film strip as it is pushed inwardly from the periphery of the spiral, and both side walls of each channel having a plurality of substantially continuous film-supporting portions extending along the same in parallel relation, each of said film-supporting portions being constructed and arranged to support the surface of the film by substantially line contact, and one of said film-supporting portions of each side of each channel being near the edge of said channel.

5. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the film strip as it is pushed inwardly from the periphery of the spiral, the width of each of the channels being narrower adjacent the open side of the channel than at any other portion of the cross section thereof.

6. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the film strip as it is pushed inwardly from the periphery of the spiral, each of said channels being substantially trapezoidal in cross section and at least one side wall of each channel having a substantially continuous film-supporting portion extending longitudinally thereof at the open side of the channel and of such shape as to support the film strip by substantially line contact.

7. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the film strip as it is pushed inwardly from the periphery of the spiral, each of said channels being substantially trapezoidal in cross section, at least one of the side walls of each channel having a film-supporting portion at the entrance to the channel and said side wall of each channel having at least one additional film-supporting portion between the entrance and the base of the channel, each of the film-supporting portions being constructed and arranged to support the film strip substantially by line contact.

8. A reel disc for film-developing tank reels comprising a base plate, a thin metal strip edgewise coiled into a flat spiral and having uniformly-spaced convolutions, and a plurality of tangs projecting from said coil and engaged with said base plate to secure said coil in spaced relation to said plate, said convolutions forming between them a space for receiving an edge portion of a film strip with the edges of the strip providing a support of limited area for the surface of the film strip.

9. A film disc for film-developing tank reels comprising a base plate part, a flat spiral part consisting of a thin edgewise coiled metal strip having uniformly-spaced convolutions, and a plurality of tangs projecting from one of said parts and engaged with the other part to secure the same together in spaced relation, said convolutions forming between them a space for receiving an edge portion of a film strip with the edges of the strip providing a support of limited area for the surface of the film strip.

10. A reel disc for film-developing tank reels comprising a base plate, a strip coiled into a flat spiral having uniformly-spaced convolutions, said strip in cross section being narrower along one side than the other, and being secured along said narrower side to said base plate, the cross section of said strip also being such that at least one side thereof provides a substantially continuous portion extending lengthwise of the strip for limited surface contact with a film strip.

11. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the forward end of the film strip as it is pushed inwardly from the periphery of the spiral, the width of each of the channels being narrower adjacent the open side of the channel than at any other portion of the cross section thereof.

12. A film-holding reel for use in film-developing tanks comprising two reel discs supported in spaced parallel relation and each having a spiral channel on its inner face opening to the periphery thereof to receive one of the marginal edges of a film strip, each of said channels having a bottom wall to guide one side of the film strip as it is pushed inwardly from the periphery of the spiral, at least one of the side walls of each of said channels having a substantially continuous film-supporting portion extending longitudinally thereof and spaced from the bottom of the channel to support the film strip by substantially line width contact along a line spaced from its corresponding edge.

ARTHUR S. ALBERTS.
SYDNEY S. ALBERTS.

REFERENCES CITED

The following references are of record in the file of this patent:

UNITED STATES PATENTS

| Number | Name | Date |
|---|---|---|
| 1,807,901 | Drew | June 2, 1931 |
| 2,073,978 | Smith | Mar. 16, 1937 |
| 2,112,606 | Pless | Mar. 29, 1938 |
| 2,218,392 | Chafvin | Oct. 15, 1940 |
| 2,290,831 | Fink | July 21, 1942 |
| 2,400,943 | Morgan et al. | May 28, 1946 |